April 15, 1958 J. L. FINCH 2,831,058

RETRANSMISSION OF CHARACTERS IN A RADIO TELEGRAPH SYSTEM

Filed Aug. 11, 1953 4 Sheets-Sheet 1

INVENTOR.
James L. Finch

BY Charles H. Brown
ATTORNEY

RETRANSMISSION OF CHARACTERS IN A RADIO TELEGRAPH SYSTEM

Filed Aug. 11, 1953 4 Sheets-Sheet 2

INVENTOR.
James L. Finch

BY Charles H. Brown
ATTORNEY

April 15, 1958 J. L. FINCH 2,831,058

RETRANSMISSION OF CHARACTERS IN A RADIO TELEGRAPH SYSTEM

Filed Aug. 11, 1953 4 Sheets-Sheet 3

INVENTOR.
James L. Finch

BY Charles H. Brown
ATTORNEY

April 15, 1958 J. L. FINCH 2,831,058

RETRANSMISSION OF CHARACTERS IN A RADIO TELEGRAPH SYSTEM

Filed Aug. 11, 1953 4 Sheets-Sheet 4

INVENTOR.
JAMES L. FINCH
BY
Charles H. Brown
ATTORNEY 2,831,058
Patented Apr. 15, 1958

2,831,058

RETRANSMISSION OF CHARACTERS IN A RADIO TELEGRAPH SYSTEM

James L. Finch, East Rockaway, N. Y., assignor to Radio Corporation of America, a corporation of Delaware Application August 11, 1953, Serial No. 373,632

8 Claims. (Cl. 178—26)

This invention relates to means for the retransmission of characters in a radio telegraph system and means for the transmission of idle signals in the absence of message signals.

This invention is particularly applicable to radio telegraph systems of the type wherein a message in a five-unit code punched on a tape is translated into a seven-unit protected code and is transmitted over a radio link to a distant terminal. At the distant terminal, the seven-unit signal is analyzed to determine whether it has a predetermined ratio of mark-to-space units. If the character signal does not have the predetermined ratio, it is a non-valid signal which has been mutilated in the transmission thereof, and the distant terminal automatically sends back a request that the mutilated character be retransmitted. Because of various time delays in the system, the transmitter does not receive the request for the repetition of a character until after a few of the following characters have been transmitted. It has been found to be impractical to back up the five-unit perforated tape to the character which was mutilated in the transmission, and therefore means for storing character signals has been necessary. In the past, the functions of storing character signals and repeating them in response to a signal from the distant terminal have been performed by equipments including elaborately interconnected electro-mechanical relays. Such equipments are known in the trade as TOM equipments, which is an abbreviation of the expression "Transmission over Multiplex," or "Telex over Multiplex." Equipments including electro-mechanical relays suffer from disadvantages such as speed of operation, reliability of operation and maintenance requirements. It is therefore a general object of this invention to provide improved equipments for the same purpose having relatively few electro-mechanical relays.

The TOM equipments also include means to translate five-unit characters having the units serially arranged in time into a five-unit signal having the five-units simultaneously available on five leads. It is therefore another object of this invention to provide improved means including a magnetic drum for translating serial signals to simultaneous signals. It is a further object to provide improved means including a magnetic drum for translating simultaneous signals to serial signals.

The TOM equipments also include means to transmit idle signals when no message signals are available. It is the practice in the art to transmit an idle alpha signal when the channel is idle, and to transmit an idle beta signal when the channel is tied up but there is no message coming in from the subscriber. It is a further object of this invention to provide improved means for the automatic transmission of idle signals when there is no traffic passing through the system.

It is a still further object of this invention to provide improved means for the performance of the above-mentioned functions in a multiplex system wherein, alternately, a channel A character signal is transmitted over a radio link when a channel B character signal is received, and then a channel B character signal is transmitted when a channel A character signal is received.

In one aspect, the invention comprises a rotating magnetic drum upon which the serial units of a five-unit character signal are recorded. Five spaced reading heads provide a simultaneous five-unit output signal. A code converter converts the simultaneous five-unit signal to a simultaneous seven-unit signal which is applied on seven separate leads to seven stationary contacts of a rotary switch. The rotating contact of the switch picks off a serial seven-unit character signal and applies it to a writing head on a second rotating magnetic drum. A reading head on the drum provides a serial seven-unit character signal output. When a signal is received requesting repetition of a character signal which has been mutilated in the transmission, the writing and reading functions of the magnetic drums are interrupted and a Roman I signal is connected to the output terminal for one character cycle. Means are provided to then read off the requested character stored on one of the magnetic drums and to read off the two following characters also stored on the drum, and then to resume transmission at the point where it was interrupted. Means are also provided to automatically transmit an idle alpha or an idle beta signal when no message signal is available for transmission.

These and other objects and aspects of the invention will be more apparent to those skilled in the art from the following detailed description taken in conjunction with the appended drawing, wherein.

Figures 1, 4:
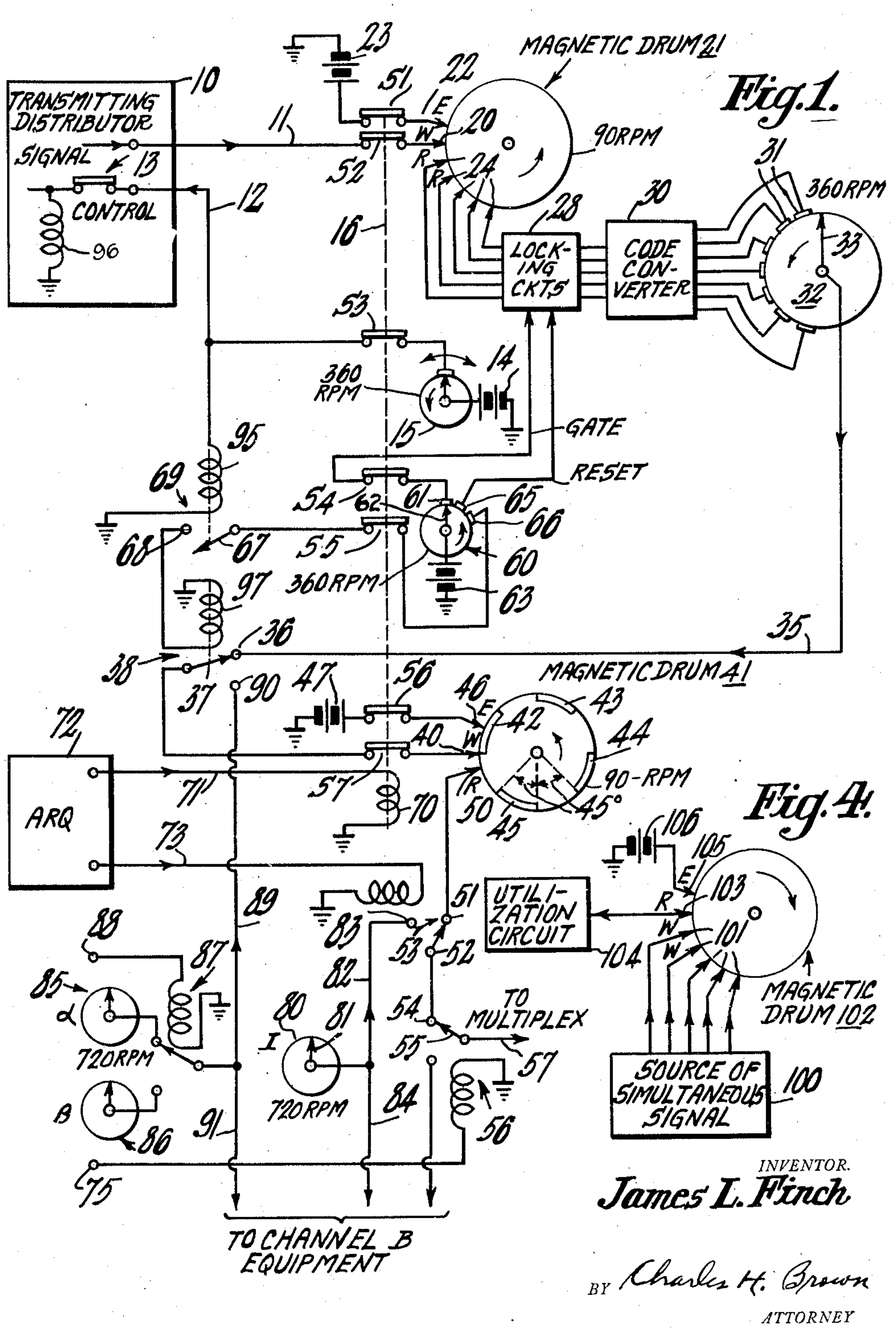
Fig. 1 is a schematic diagram of one embodiment of the invention.
Fig. 4 shows a modification of a portion of the system of Fig. 1 for the purpose of translating simultaneous signals to serial signals.

Referring to Fig. 1, a transmitting distributor 10 reads a perforated tape (not shown) and provides a five-unit serial signal on lead 11. The five-unit tape in transmitting distributor 10 is advanced one character every time a control pulse is applied thereto on lead 12. A normally closed tight tape switch 13 is opened whenever perforated signal tape is no longer fed into the distributor 10. Tape advancing pulses are generated by a battery 14 and a rotary switch 15 and are applied thru switch S3 and lead 12 to the transmitting distributor 10. Switch contacts S1 thru S7 are on a common actuating armature as represented by dotted line 16.

Five unit serial character signals on lead 11 are applied thru switch S2 to a writing head 20 disposed at the periphery of a magnetic drum 21 which is rotated at 90 R. P. M. The speed of rotation of the various rotating elements in the embodiment of Fig. 1 are chosen, by way of example, to provide a speed of operation of 60 words per minute. An erasing head 22 is disposed to erase signals on magnetic drum 21 just prior to passing under the writing head 20. The erasing head 22 is energized thru switch S1 from a battery 23. Four five-unit signals are stored on four quadrants of the magnetic drum 21, each character signal being allotted one-fourth of the circumferential distance of the drum. Five reading heads 24 are disposed in spaced relationship along an arcuate line having a length equal to one-fourth the circumference of the magnetic drum 21 to simultaneously read the five units of the character signal on the most recently recorded quadrant of the drum 21. By this arrangement, successive character signals, each including five serially arranged mark or space units, are recorded on magnetic drum 21. There is room on the circumference of the drum 21 for four character signals on four quadrants of the drum, and the oldest character signal stored on the drum is always erased to make room for the next following character signal. The five reading heads 24 are arranged in a spaced relationship corresponding with the spacing in time of the five units of each character signal. Therefore, the five outputs from the five reading heads reproduce the most recently recorded character signal as five simultaneous units on five separate leads. The means by which the other stored character signals are utilized when an error occurs will be made apparent as the description proceeds.

The five reading heads 24 are connected by five leads to five separate locking circuits 28. Locking circuits 28 may be of the conventional type including two vacuum tubes connected as a bistable multivibrator which may be gated to receive and store input signals and which may be reset by a reset pulse.

Figure 5:
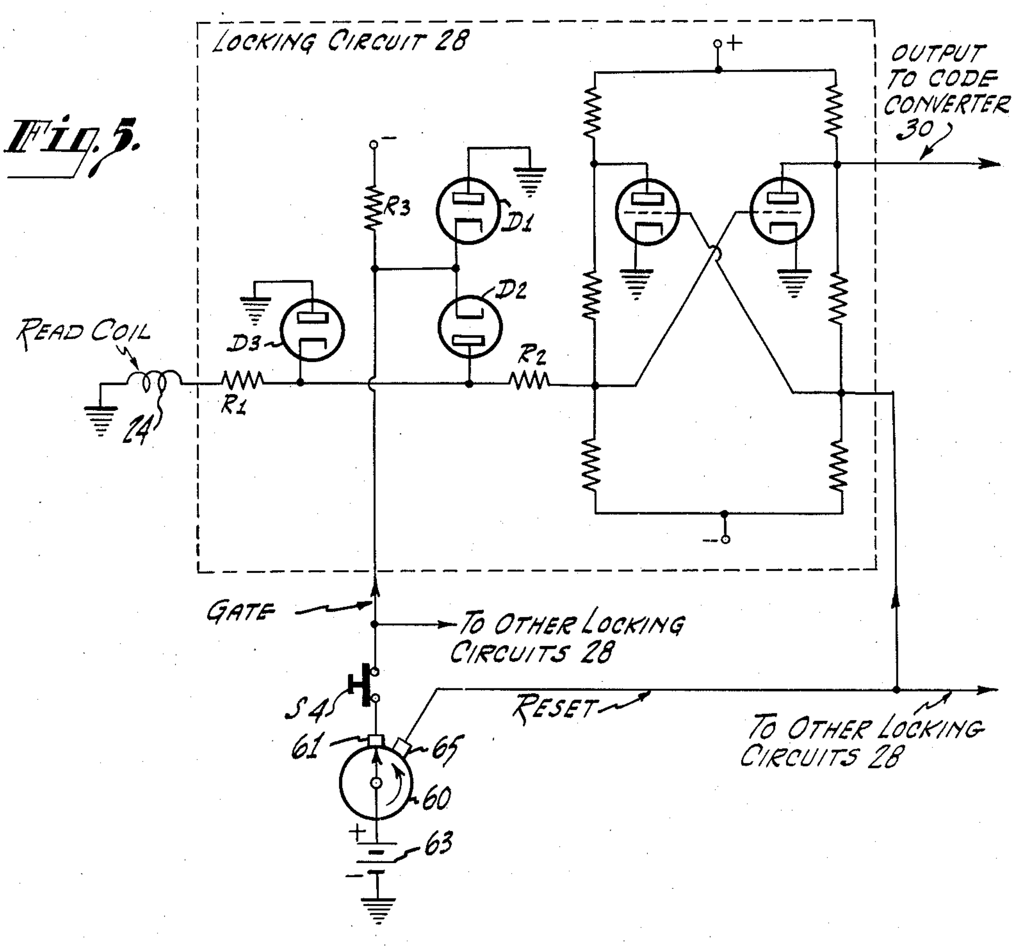
Fig. 5 shows a locking circuit for use in the system of Fig. 1.

Bistable multivibrators are shown and described following page 164 of "Waveforms," volume 19 of the Radiation Laboratory Series, McGraw-Hill Book Co., 1949. The circuit shown on page 164 of "Waveforms" may be triggered, reset and gated according to the arrangement shown in Figure 5. In Figure 5 read coil 24 will have induced in it pulses at the instant when a change of state in the magnetic drum 21 moves past it. When this change of state is from spacing to marking a positive voltage is generated. When it is from marking to spacing, a negative voltage is generated. The positive voltages generated are impressed on the locking circuit and if the locking circuit was formerly in a condition corresponding to spacing characters it will be thrown to the condition corresponding to a marking character. The reset pulses from brush 65 throw the locking circuits to the spacing condition. Negative pulses from the read coil are not effective since they are bypassed to ground thru diode D3 which has low impedance for negative pulses compared with that of resistor R1. Positive pulses are not effected by diode D3 because it has a high impedance to positive pulses. When the gate bus is disconnected from positive voltage source 63 a negative voltage is impressed thru R3 on the cathode of diodes D1 and D2. Under these conditions a positive pulse from read coil 24 is bypassed by diode D2 so that it will not be effective in changing the locking circuit condition. The gate bus receives a positive voltage thru brush 61 at the time when it is desired to impress signals from magnetic drum 21 on to the locking circuits. This positive voltage blocks out diodes D1 and D2 and allows positive pulses from read coil 24 to change the locking circuit from the spacing condition to the marking condition. Diode D1 is required to prevent transitions, coincident with contact between voltage source 63 and brush 61, from effecting the locking circuit.

As shown in Fig. 1, five output leads from locking circuits 28 are connected to a code converter 30 for converting a simultaneous five-unit input signal to a simultaneous seven-unit output signal on seven leads. The code converter 30 may be of the type described in the copending application entitled "Code Converter," Serial No. 364,074, filed by James S. Harris on June 23, 1953, now Patent No. 2,716,156, issued August 23, 1955, or code converter 30 may be of any other known suitable type. The seven output leads from code converter 30 are connected to seven spaced stationary contacts 31 disposed around 180 degrees of a rotary switch 32 having an armature 33 rotated at 360 R. P. M.

The armature 33 of rotary switch 32 is connected over a lead 35 thru contacts 36 and 37 of a relay 38, and thru switch S7 to a writing head 40 on magnetic drum 41. Magnetic drum 41 is rotated at 90 R. P. M., and it has four spaced magnetic segments 42, 43, 44, and 45 of 45 degrees each. An erasing head 46 is energized thru switch S6 from a battery 47. A reading head 50 disposed adjacent to writing head 40 is connected thru the contacts 51 and 52 of an error relay 53 and thru the contacts 54 and 55 of a time division relay 56 to an output lead 57. Output lead 57 is connected to a multiplex equipment (not shown) and then to a radio transmitter (not shown).

A rotary switch 60 includes a stationary contact 61 connected thru switch S4 to all five of locking circuits 28. Armature 62 of rotary switch 60 rotates at 360 R. P. M. to generate a pulse from battery 63 which is applied as a gate to the locking circuits 28 to make them receptive to the signals picked up by reading heads 24 on magnetic drum 21. Rotary switch 60 also includes a stationary contact 65 on which a reset pulse is generated and applied to all five of the locking circuits 28. A third stationary contact 66 on rotary switch 60 is connected thru switch S5 to the contacts 67 and 68 of a first idle relay 69. Contact 68 is connected to the operating coil of second idle relay 38.

Switch contacts S1 thru S7 are all simultaneously operated by an operating coil 70 connected over lead 71 to an ARQ equipment 72. The letters ARQ represent an abbreviation for "Automatic Request for Repetition." The output on lead 71 from equipment 72 is a relay operating voltage having a duration equal to the duration of four signal characters. A second relay operating voltage output from equipment 72 is available on lead 73 connected to the operating coil of error relay 53. The signal on lead 73 has a duration approximately equal to that of one character signal.

That part of Fig. 1 which has thus far been described includes the equipment for one channel of a multiplex terminal. This channel may be designated channel A. Channel B equipment (not shown) may be exactly the same as the channel A equipment but arranged for operation with a 180 degree phase displacement so that the outputs from channels A and B may be alternately switched by relay 56 to the output lead 57. Relay 56 is operated by a time division square wave signal from terminal 75.

Seven-unit coded signals representative of Roman I, alpha and beta are supplied to both channel A equipment and channel B equipment from common sources. A Roman I signal is supplied by a rotary switch 80 having contacts around the periphery arranged to generate the seven-unit signal representative of Roman I. These stationary contacts (not shown) are connected to a source of potential so that as the armature 81 rotates at 720 R. P. M., the character signal is applied over lead 82 to contact 83 of relay 53, and over lead 84 to a corresponding contact on a corresponding relay in the channel B equipment. In a similar manner, a rotary switch 85 generates an alpha signal and a rotary switch 86 generates a beta signal. A relay 87 actuated in response to a signal from terminal 88 determines whether an idle alpha or an idle beta signal will be supplied over lead 89 to contact 90 of second idle relay 38 and over lead 91 to a corresponding contact of a corresponding relay in the channel B equipment.

Figure 2:
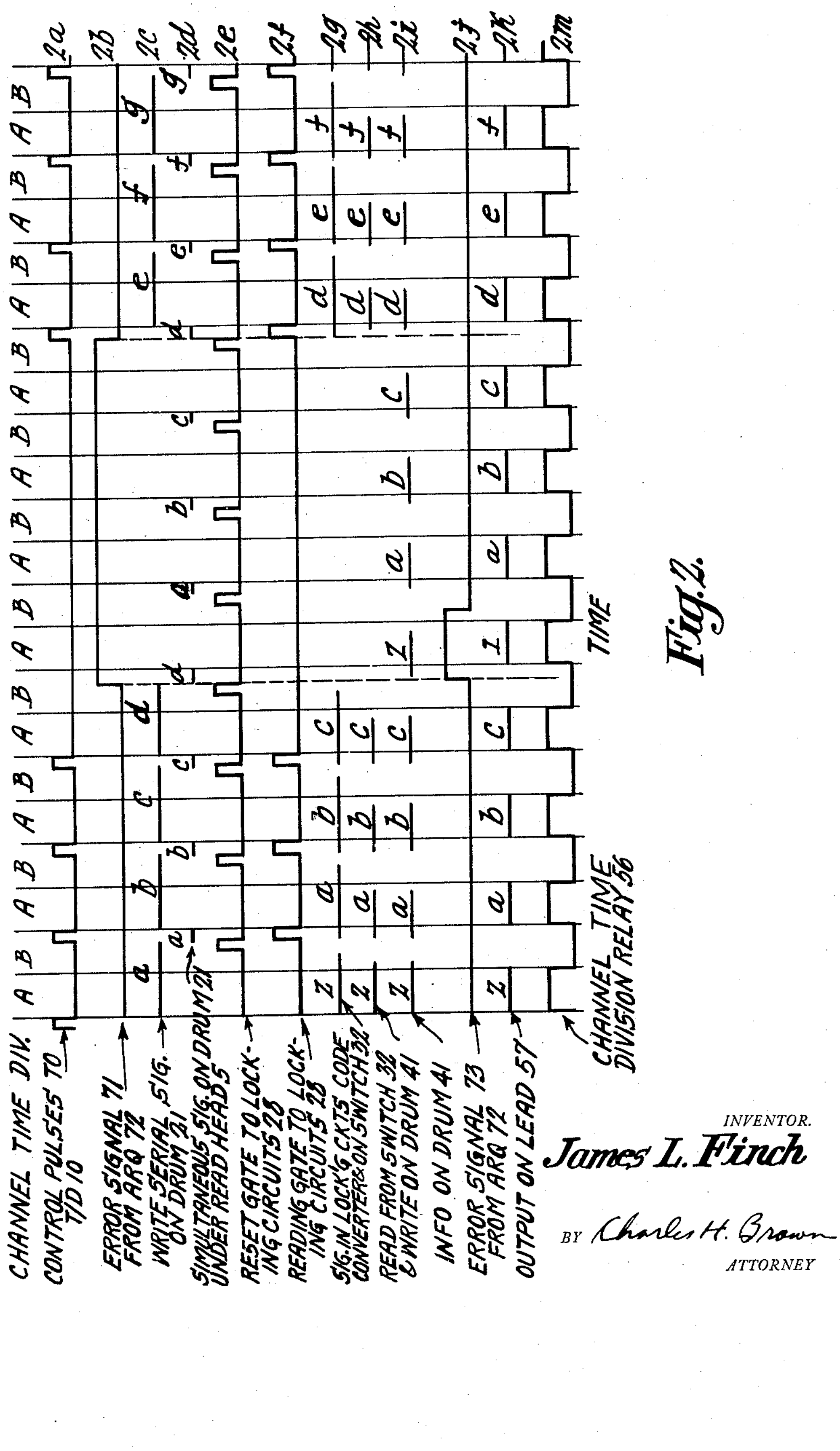
Fig. 2 is an operational time chart which will be used in explaining the operation of the embodiment of Fig. 1 in performing the function of retransmitting characters which have been mutilated in the radio link.

The operation of the circuit of Fig. 1 will now be described with references to the operational time chart of Fig. 2 to show how the equipment operates in response to a signal from the distant terminal indicating that one of the characters was mutilated in the transmission. In the chart of Fig. 2, time on the horizontal axis is divided by vertical lines into equal units alternately allocated to channel A and channel B. Curve $2a$ illustrates the control pulses generated by rotary switch 15 and applied thru switch S3 and lead 12 to the transmitting distributor 10. The five-unit perforated tape in transmitting distributor 10 is advanced one character every time a control pulse is applied thereto. In the absence of an error signal from lead 71 of ARQ equipment 72, switches S1 thru S7 remain in the closed positions shown in Fig. 1. Five-unit signals from distributor 10 are applied over lead 11 to the writing head 20 on magnetic drum 21. The speed of rotation of magnetic drum 21 is such that four character signals may be recorded on the four quadrants thereof. The chart of Fig. 2 assumes that the alphabetic characters *a*, *b*, *c* and *d* are successively written on magnetic drum 21. The serially written units of each character signal simultaneously pass under the reading heads 24 to produce a voltage transition which is applied over five leads to five locking circuits 28. At the time a full character stored in 21 is arranged ahead of reading head 24 and just prior to the application of the voltage transitions to locking circuits 28, a gating pulse is applied from stationary contact 61 of rotary switch 60 to the locking circuits to render them receptive to the input voltage transitions. This gate pulse occurs at substantially the same time as the control pulses from rotary switch 15 which are shown in the operational time chart by wave 2*a*. The closing time of switch 15 is preferably made adjustable by varying the position of the stationary contact to allow for the time delay in the operation of transmitting distributor 10; and to allow for the travel time of control signals over lead 12, and the character signals returning on lead 11, when the transmitting distributor 10 is located at a remote point. The periods during which alphabetic character signals *a* thru *d* are written on magnetic drum 21 are represented by wave 2*c*, and the periods during which these alphabetic character signals are simultaneously picked up by reading heads 24 are represented by wave 2*d*. Reading gates from rotary switch 60 are applied to locking circuits 28 at times represented by curve 2*f* and reset gates shown by curve 2*e* are applied to locking circuits 28 immediately prior to the application of each reading gate so that the information previously stored in the locking circuits is cleared out. The alphabetic character signal in the locking circuits 28, the code converter 30 and on the contacts of rotary switch 32, at any one period of time, are as shown by curve 2*g*. Curve 2*h* shows the time periods during which the alphabetic character signals are read from the contacts of rotary switch 32 and written on the magnetic drum 41 by means of writing head 40. The information stored on magnetic drum 41 and available to be read is as shown by wave 2*i*. It will be understood that at any one instant, an alphabetic character signal is stored on each one of the four magnetic segments 42 thru 45. Normally, immediately after an alphabetic character signal has been written on magnetic drum 41, it is read off by reading head 50 and supplied to output lead 57, the output being as shown by curve 2*k*. Channel time division switch relay 56 operates as shown by wave 2*m*.

In the chart of Fig. 2, it is assumed that the alphabetic character signal *a* was mutilated when it was received at the distant terminal and that the distant terminal sent back a request that the character signal be repeated, i. e., retransmitted. Due to various time delays in the system, the signal requesting repetition was not received until after the alphabetic character *d* has been read from the perforated tape in the transmitting distributor 10. The signal requesting repetition appears on lead 71 of the ARQ equipment 72 to operate relay coil 70 and open all of switches S1 thru S7. This signal is as shown by curve 2*b*. At the time that the error signal is received, the alphabetic character signals *a*, *b*, *c* and *d* are stored on magnetic drum 21 and the alphabetic character signals *z*, *a*, *b*, and *c* are stored on the four segments of magnetic drum 41. When the switches S1 thru S7 open, switch S1 prevents the erasing of signals stored on magnetic drum 21, switch S2 prevents the writing of new information on magnetic drum 21, switch S3 prevents the application of tape advancing pulses to the transmitting distributor 10, switch S4 prevents the application of gating pulses to the locking circuits 28, switch S6 prevents the erasing of information stored on magnetic drum 41 and switch S7 prevents the writing of new information on magnetic drum 41.

At the same time that an error signal is initiated on lead 71 from the ARQ equipment 72, a second error signal of shorter duration is initiated on lead 73. This signal is as shown by curve 2*j* of Fig. 2. The signal acts to energize relay 53 to cause a Roman I signal from rotary switch 80 to be supplied thru lead 82, switch contacts 83 and 52 and switch contacts 54 and 55 to the output lead 57. The operation of relay 53 is thus such as to supply a Roman I signal to the output lead 57 in place of the alphabetical character signal *z* which is stored on magnetic drum 41. The next following alphabetic character read off of magnetic drum 41 by reading head 50 is the alphabetic character *a*. Alphabetic characters *b* and *c* are in turn read off of drum 41 and supplied to output lead 57. Then, as shown in the operational time chart of Fig. 2, the error signal 2*b* from lead 71 terminates and allows all of switch contacts S1 thru S7 to return to their normal closed positions. Then a control pulse from rotary switch 15 is applied to transmitting distributor 10 to cause a resumption of the stepping of perforated tape thru the distributor, and alphabetic character signal *e* is applied over the lead 11 to the writing head 20 on magnetic drum 21. However, before writing head 20 records the alphabetic character signal *e*, the alphabetic character signal *d* previously stored in magnetic drum 21 is read off simultaneously by reading heads 24 and applied to locking circuits 28. Locking circuits 28 are gated from the rotary switch 60 so that the character signal *d* is stored in the locking circuits and applied through the code converter 30 to the stationary contacts on rotary switch 32. The character signal *d* read off of rotary switch 32 is applied over lead 35 to the writing head 40 of magnetic drum 41. Immediately thereafter, the character signal *d* is read off of drum 41 by reading head 50 and applied to the output lead 57.

It is thus far apparent that the equipment of Fig. 1 operates in a manner so as to respond to the receipt of a signal requesting repetition of character signal *a* by inserting a Roman I signal followed by a repetition of the alphabetic character signal *a* which was mutilated in transmission, followed by alphabetic character signals *b* and *c* which were stored in the magnetic drum 41. Then the alphabetic character signal *d* which was stored in magnetic drum 21 is released from the system to output lead 57. During the time that the alphabetic character signal *d* is released from magnetic drum 21, the next successive alphabetic character signal *e* is being written on magnetic drum 21 so that it appears on output lead 57 following the alphabetic character signal *d*. The equipment continues then to operate in the normal manner until and unless a new request for repetition is supplied on leads 71 and 73 from ARQ equipment 72.

The operation of the equipment of Fig. 1 will now be described with the aid of the operational time chart of Fig. 3 to show how the equipment supplies an idle alpha and an idle beta signal to the output lead 57 when message signals are not available from the transmitting distributor 10. The time chart of Fig. 3 assumes that alphabetic character signals *a*, *b*, *c* and *d* are supplied on lead 11 to the writing head 20 of magnetic drum 21. Then it is assumed that no further message signals are available from transmitting distributor 10. As a result, the perforated tape in the distributor 10 becomes slack allowing the tight tape switch 13 to open.

Figure 3:
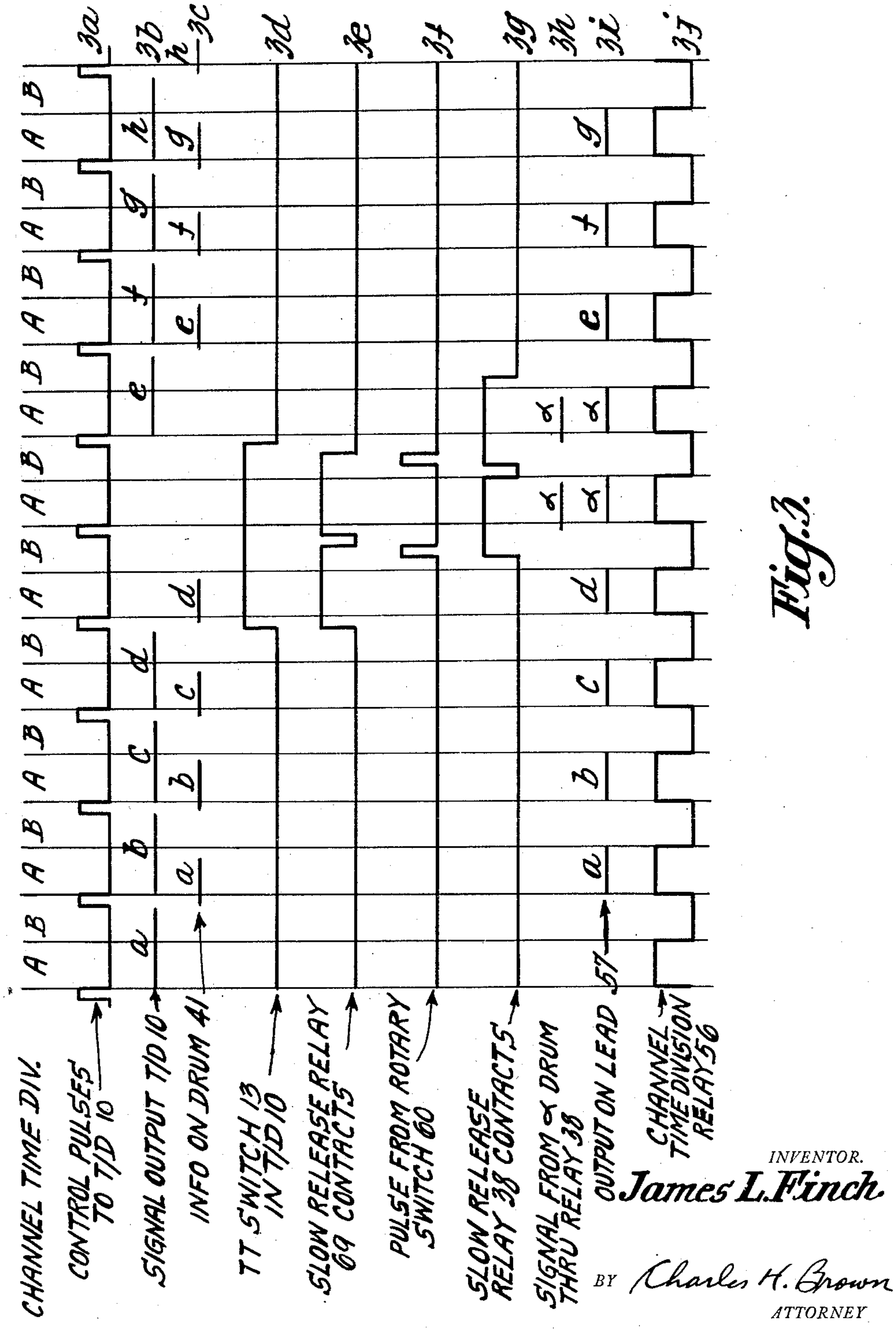
Fig. 3 is an operational time chart which will be used in explaining the operation of the embodiment of Fig. 1 in generating idle alpha and idle beta signals in the absence of available message signals.

The operation of the tight tape switch 13 is represented in Fig. 3 by the curve 3*d*. The immediately following control pulse from the rotary switch 15 is impressed across the operating coil 95 of the first idle relay 69. Coil 95 has a much higher impedance than an operating coil 96 located within the transmitting distributor 10. Therefore, control pulses from rotary switch 15 have no effect on relay 69 when the tight tape switch 13 is closed. However, when tight tape switch 13 is open, the full effect of the control pulse is operative to energize relay 69 and cause a closing of contacts 67 and 68. Relay 69 is a slow release relay which holds contacts 67 and 68 closed for a period of time approximating the time of one character signal as shown by curve 3*e* of Fig. 3. When contacts 67 and 68 are closed the next following pulse from stationary contact 66 on rotary switch 60, as shown by wave 3*f* of Fig. 3, is applied to operating coil 97 of the second idle signal relay 38. Relay 38 is also a slow release relay so that the contacts 37 and 90 remain closed for a period of time as shown by wave 3*g* of Fig. 3. During the time that contacts 37 and 90 are closed, an idle alpha or an idle beta signal is applied over lead 89, thru contacts 90 and 37, thru switch S7 to the writing head 40 on magnetic drum 41. The idle alpha or the idle beta signal is then immediately read off by reading head 50 and the signal is applied thru switch contacts 51 and 52, and thru switch contacts 54 and 55 to the output lead 57. A control signal applied from terminal 88 to the operating coil of relay 87 determines whether the signal applied over lead 89 is an idle alpha signal from rotary switch 85 or an idle beta signal from rotary switch 86. Rotary switches 85 and 86 rotate continuously in proper phase with the rest of the equipment so that the signals are inserted between succeeding alphabetic message character signals in the time allotted to channel A. Every other revolution of rotary switches 85 and 86 occurs during the time allotted to channel A. The intermediate revolutions of rotary switches 85 and 86 occur in the time allocated to channel B and are conveyed to the channel B equipment over lead 91 when called for. The idle alpha signal applied thru relay contacts 37 and 90 are as represented by curve 3*h*.

Fig. 3 assumes that after the alphabetic message character *d* has been supplied over lead 11 from the transmitting distributor 10, the tight tape switch 13 is open for the period of two message characters and then the tight tape switch 13 is closed for the transmission of the following alphabetic character signals *e* thru *h*. Curve 3*e* shows that the slow release relay 69 is operated twice in the period that the tight tape switch 13 is open. During these two periods, pulses from stationary contact 66 of rotary switch 60, as shown by wave 3*f*, actuates slow release relay 38, the contacts of which connect the idle alpha signal over lead 89 to the writing head 40 on magnetic drum 41 as shown by wave 3*g*. The output on lead 57 is thus shown by wave 3*i* to consist of the alphabetic character signals *a* thru *d* followed by two alpha signals which are in turn followed by the alphabetic character message signals *e*, *f*, *g* and so on. It is thus apparent that the equipment operates in a manner such as to transmit idle alpha or idle beta signals in the absence of message signals from the output lead 11 of the transmitting distributor 10.

It will be understood that the magnetic drums and rotary switches are synchronously driven in proper speed and phase relationships by well-known driving means (not shown). It will also be understood that the rotary switches shown and described may be replaced by electronic switches well-known in the art.

If idle alpha (or idle beta) signals are being transmitted when a signal is received requesting a repetition of a character which was received at the distant terminal in a mutilated form, four idle alpha signals will be stored on the magnetic segments 42 thru 45 of magnetic drum 41. Switches S6 and S7 will then be opened to prevent the erasure of the idle alpha signals on the drum and to prevent the recording of additional signals on the drum. The contacts of relay 53 are simultaneously shifted to send one Roman I signal from rotary switch 80 thru lead 82, contacts 83 and 52, and contacts 54 and 55 to the output lead 57. Then the remaining three idle alpha signals on magnetic drum 41 are read off by reading head 50 and supplied to the output lead 57. Then switch contacts S6 and S7 reclose so that idle alpha signals are again applied from the rotary switch 85 to the writing head 40 to be read off by the reading head 50 and applied to output lead 57. Regardless of whether message character signals or idle alpha character signals or idle beta character signals are being transmitted when a request for repetition of a transmitted character signal is received, one Roman I signal is transmitted followed by the character signal which was mutilated in the transmission, in turn followed by the two succeeding character signals stored in the system, and then followed by the succeeding message character signals or the succeeding alpha or beta character signals as the case may be.

The channel A equipment shown in Fig. 1 and the identical channel B equipment operate on a time sharing basis without any interference one with the other. A request for repetition directed to the channel A equipment has no effect on the operation of the channel B equipment, and vice versa. Idle alpha, idle beta or Roman I signals may be transmitted over both channels on a time sharing basis.

Fig. 4 shows a modification of the elements 20 thru 24 of Fig. 1, to provide means for translating simultaneous character signals to serial character signals. The five simultaneous unit signals of a character signal from source 100 are applied over five leads to five recording or writing heads 101. Writing heads 101 are disposed in spaced relation around the periphery of a rotating magnetic drum 102. The magnetic medium moves from under writing heads 101 to under a reading head 103 coupled to a utilization circuit 104. The recording medium continues past an erasing head 105 energized from a battery 106.

In the operation of the circuit of Fig. 4, the five simultaneous units of a character signal are simultaneously recorded on rotating drum or medium 102. The recorded unit signals are then read in succession by reading head 103 and applied to the utilization circuit 104. The time spacing of the serial unit signals is determined by the spacing of the writing heads 101 and the speed of rotation of magnetic drum 102. After the serial unit signals are read by reading head 103, they are erased by erasing head 105 in preparation for the recording of following simultaneous character signals.

What is claimed is:

1. In a radio telegraph terminal, a source of message signals wherein each character signal includes $n$ signal units arranged serially in time, a rotating endless recording medium, means to record said character signals on said medium, $n$ reading heads disposed in spaced relationship adjacent said medium so that said $n$ signal units recorded thereon simultaneously pass under said $n$ reading heads, $n$ leads connected respectively to said $n$ reading heads to provide character signals wherein $n$ units occur simultaneously in time, means to convert said simultaneous $n$ unit character signals to simultaneous $n$ unit character signals on $p$ leads, means to translate said signal on $p$ leads to a signal wherein each character is represented by $p$ units serially arranged in time, a second endless moving recording medium and means to record said last named translated signals on said second recording medium, a single recording head disposed adjacent to said second recording medium to read signals recorded thereon after they have been recorded, and erasing heads disposed adjacent to both of said recording media to erase signals thereon immediately prior to the passage of the media past said writing or recording means.

2. The combination as defined in claim 1 constituting a first channel equipment, and in addition, a second channel equipment operated 100 degrees out of phase with said first channel equipment, and means to alternately connect the outputs of said first and second equipment to a common output terminal.

3. The combination as defined in claim 2, and in addition, a source of an idle signal, and relay means to reconnect either of said recording heads adjacent said second recording mediums to the output of said source of idle signals.

4. In a telegraph terminal, the combination of, a source of signals wherein each character is represented by $n$ signal units on a single lead and serially arranged in time, an endless moving recording medium, writing means disposed contiguous with said recording medium and connected to said signal source to record said signals on said medium, erasing means disposed contiguous to said recording medium to erase signals thereon immediately prior to the writing of new signals by said writing means, said endless recording medium having a length with relation to said character signals to provide for the storage of $p$ character signals on said medium at any given time, and $n$ reading heads disposed in space relationship over $1/p$ of said recording medium immediately following said writing means, said $n$ reading heads being positioned to simultaneously read the $n$ units of one character signal to provide a simultaneous signal output therefrom on $n$ leads.

5. In a telegraph terminal, means to continuously store $p$ character signals for use in the event that a delayed request is received to retransmit a character comprising, a source of successive message character signals, magnetic storage means including writing and reading means for continuously storing said $p$ message character signals from said source on said storage means, a second magnetic storage means having writing means coupled to the output of said first storage means to store $p$ message character signals on said second storage means with a time lag equal to the time allotted to one message character, a source of a repetition indicating signal, means responsive to a first repetition requesting signal to interrupt said writing means of both of said storage means for a period of time equal to that of $p$ message signals, an output lead, means for reading said character signals stored by said second storage means, means normally connecting said reading means of said second storage means to said output lead, and means responsive to a second shorter repetition requesting signal to connect the output of said source of a repetition indicating signal to said output lead for a period of time at least equal to that of one character signal.

6. The combination as defined in claim 5, and in addition, a source of an idle signal for use when a message signal is not available, a switch operative in response to the absence of a message signal, and means responsive to said last named switch to connect said output lead to the output of said source of an idle signal.

7. Means to translate a coded character signal of $n$ units arranged serially in time to the same character signal with $n$ units existing simultaneously, comprising, a source of a serial character signal of $n$ units, a moving recording medium, a recording head positioned adjacent said moving medium and coupled to said source, and $n$ reading heads disposed in spaced relation along said moving medium, said reading heads having a spacing equal to the spacing of serial units recorded on the medium by said recording head, whereby a serial character signal of $n$ units becomes simultaneously available from said $n$ reading heads.

8. Means to translate a coded character signal of $n$ units existing simultaneously to the same character signal in the form of $n$ units arranged serially in time, comprising, a source of a simultaneous signal on $n$ leads, a moving recording medium, $n$ recording heads each coupled to one of said leads and arranged in spaced relation along said recording medium, and a reading head disposed adjacent said recording medium at a point in the path of said medium from said recording heads, whereby the simultaneous unit signals recorded on said medium become serially available from said reading head.

References Cited in the file of this patent

UNITED STATES PATENTS

| | | |
|---|---|---|
| 2,296,845 | Goetz | Sept. 29, 1942 |
| 2,518,405 | Van Duuren | Aug. 8, 1950 |
| 2,540,654 | Cohen et al. | Feb. 6, 1951 |
| 2,550,427 | Potts | Aug. 24, 1951 |
| 2,632,057 | Koenig | Mar. 17, 1953 |
| 2,700,148 | McGuigan et al. | Jan. 18, 1955 |
| 2,706,215 | Van Duuren | Apr. 12, 1955 |

OTHER REFERENCES

"Static Magnetic Memory," "Electronics," p. 108–111, January 1951, 340–174.6.